United States Patent
Lee et al.

(10) Patent No.: US 9,560,539 B2
(45) Date of Patent: Jan. 31, 2017

(54) METHOD FOR ALLOWING TERMINAL TO REPORT MEASUREMENT RESULT FOR MDT TO BASE STATION IN WIRELESS COMMUNICATION SYSTEM AND DEVICE THEREFOR

(75) Inventors: Kyungjun Lee, Anyang-si (KR); Sungduck Chun, Anyang-si (KR); Seungjune Yi, Anyang-si (KR); Sunghoon Jung, Anyang-si (KR); Youngdae Lee, Anyang-si (KR); Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 13/810,640

(22) PCT Filed: Aug. 10, 2011

(86) PCT No.: PCT/KR2011/005826
§ 371 (c)(1),
(2), (4) Date: Jan. 16, 2013

(87) PCT Pub. No.: WO2012/023733
PCT Pub. Date: Feb. 23, 2012

(65) Prior Publication Data
US 2013/0121204 A1    May 16, 2013

Related U.S. Application Data

(60) Provisional application No. 61/374,235, filed on Aug. 16, 2010, provisional application No. 61/374,584, filed on Aug. 17, 2010.

(51) Int. Cl.
*H04W 24/10* (2009.01)
*H04W 24/08* (2009.01)

(52) U.S. Cl.
CPC ............ *H04W 24/10* (2013.01); *H04W 24/08* (2013.01)

(58) Field of Classification Search
USPC ............ 370/241, 252; 455/422.1, 423, 115.1
See application file for complete search history.

(56) References Cited

U.S. PATENT DOCUMENTS

2006/0098603 A1* 5/2006 Cave et al. ................... 370/335
2006/0128371 A1* 6/2006 Dillon et al. ................. 455/423
(Continued)

FOREIGN PATENT DOCUMENTS

| WO | WO 2010113732 A1 * | 10/2010 | |
| WO | WO2012000547 A1 * | 1/2012 | |
| WO | WO 2012000547 A1 * | 1/2012 | ........ H04W 72/1231 |

OTHER PUBLICATIONS

ETSI TR 102 682 V1.1.1, "Reconfigurable Radio Systems (RRS); Functional Architecture (FA) for the Management and Control of Reconfigurable Radio Systems," Jul. 2009, 45 pages.
(Continued)

*Primary Examiner* — Hanh N Nguyen
*Assistant Examiner* — Jose L Perez
(74) *Attorney, Agent, or Firm* — Birch, Stewart, Kolasch & Birch, LLP

(57) ABSTRACT

The present invention provides a method for a terminal to report the measurement result of a minimization of drive test (MDT) in a wireless communication system. More specifically, the method comprises the steps of: receiving MDT setup information from said base station; performing cell measurement on the basis of said MDT setup information; storing the result of said cell measurement in an MDT log on the basis of a valid time that precedes as much as the second interval from storage times, at every storage time of a first interval unit that is contained in said MDT setup informa-
(Continued)

tion; and reporting to said base station the MDT log in which the result of said cell measurement is stored.

12 Claims, 10 Drawing Sheets

(56) References Cited

U.S. PATENT DOCUMENTS

| | | | |
|---|---|---|---|
| 2010/0113008 A1* | 5/2010 | Wang et al. ................ 455/423 |
| 2010/0279679 A1* | 11/2010 | Young ............... H04W 36/0083 |
| | | | 455/423 |
| 2010/0302962 A1* | 12/2010 | Oota ..................... H04W 8/24 |
| | | | 370/252 |
| 2011/0081871 A1* | 4/2011 | Molnar ................... 455/67.13 |
| 2011/0201279 A1* | 8/2011 | Suzuki ................ H04W 24/10 |
| | | | 455/67.11 |
| 2011/0276838 A1* | 11/2011 | Zhou et al. .................... 714/45 |
| 2012/0039189 A1* | 2/2012 | Suzuki ................ H04W 24/10 |
| | | | 370/252 |
| 2012/0106370 A1* | 5/2012 | Radulescu ........ H04W 36/0083 |
| | | | 370/252 |
| 2013/0010631 A1* | 1/2013 | Jung .................... H04W 24/10 |
| | | | 370/252 |

OTHER PUBLICATIONS

Nokia et al., "MDT Mobility Optimization," 3GPP TSG-RAN WG2 Meeting #67bis, R2-095637, Agenda Item 4.2.2.1, Oct. 12-16, 2009, Miyazaki, Japan, 7 pages.

* cited by examiner (a) Control-plane protocol stack (b) User-plane protocol stack

METHOD FOR ALLOWING TERMINAL TO REPORT MEASUREMENT RESULT FOR MDT TO BASE STATION IN WIRELESS COMMUNICATION SYSTEM AND DEVICE THEREFOR

This application is the National Phase of PCT/KR2011/005826 filed on Aug. 10, 2011, which claims priority under 35 U.S.C. 119(e) to the U.S. Provisional Application No. 61/374,235 filed on Aug. 16, 2010 and 61/374,584 filed on Aug. 17, 2010, all which are hereby expressly incorporated by reference into the present application.

TECHNICAL FIELD

The present invention relates to a wireless communication system, and more particularly, to a method of reporting an MDT (minimization of drive test) measurement result, which is reported by a user equipment to an eNode B in a wireless communication system and apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE) 120, an eNode B (eNB) 110a/110b, and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention provides a method of reporting an MDT measurement result, which is reported by a user equipment to an eNode B in a wireless communication system and apparatus therefor.

Technical Solution

To achieve these and other advantages and in accordance with the purpose of the present invention, as embodied and broadly described, a method of reporting an MDT (minimization of drive test) measurement result, which is reported by a user equipment to an eNode B in a wireless communication system may include the steps of receiving an MDT configuration information from the eNode B, performing a cell measurement based on the MDT configuration information, storing the cell measurement result in an MDT log on every timing point of storing of a $1^{st}$ interval unit, which is contained in the MDT configuration information, based on a valid timing point preceding as much as a $2^{nd}$ interval from the timing point of storing, and reporting the MDT log having the cell measurement result stored therein to the eNode B. In particular, the user equipment may be in an RRC (radio resource control) idle state.

Preferably, if a plurality of cell measurement results exist in the valid timing point and the timing point of storing, the cell measurement result measured on a nearest timing point to the timing point of storing among a plurality of the cell measurement results may be stored in the MDT log. Or, an average value of a plurality of the cell measurement results may be stored in the MDT log.

Meanwhile, if the cell measurement result does not exist in the valid timing point and the timing point of storing, a preset value may be stored in the MDT log. In particular, the preset value may include a lowest value among the value indicated by the cell measurement result. Or, the cell measurement result measured on a nearest timing point to the valid timing point among the cell measurement results measured before the valid timing point may be stored in the MDT log. In particular, the MDT log may include an indicator indicating that the stored cell measurement result is the measurement result measured before the valid timing point.

More preferably, the MDT configuration information may include the information on the $2^{nd}$ interval.

Meanwhile, the $1^{st}$ interval and the $2^{nd}$ interval may be defined by a multiple unit of a discontinuous reception (DRX) cycle.

Advantageous Effects

According to the aforementioned embodiments of the present invention, a user equipment may be able to report more trustworthy MDT measurement result to an eNode B.

Effects obtainable from the present invention may be non-limited by the above mentioned effect. And, other unmentioned effects can be clearly understood from the following description by those having ordinary skill in the technical field to which the present invention pertains.

BEST MODE MODE FOR INVENTION

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
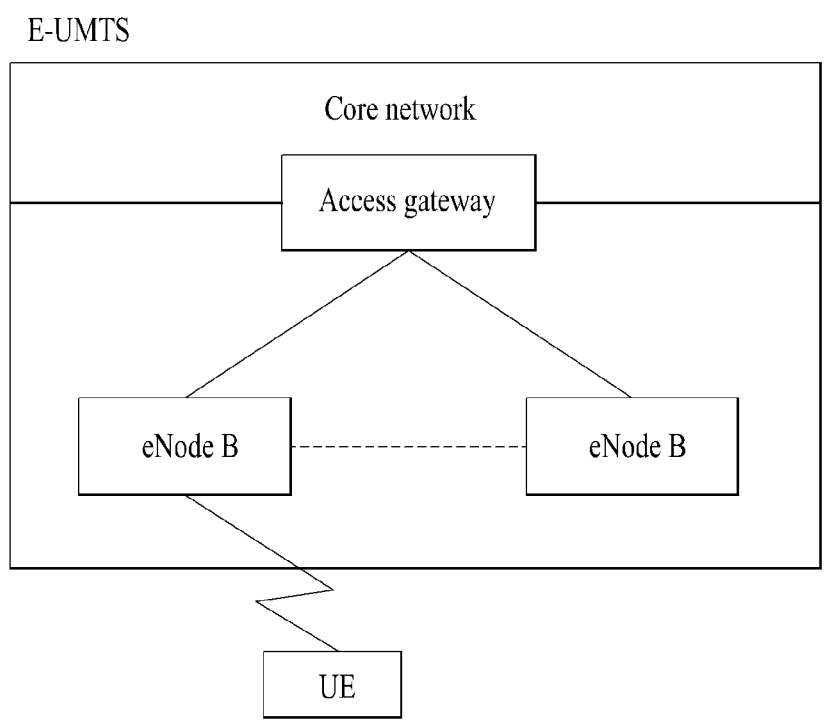
FIG. 1 is a schematic diagram of E-UMTS network structure as one example of a wireless communication system.
Figure 2:
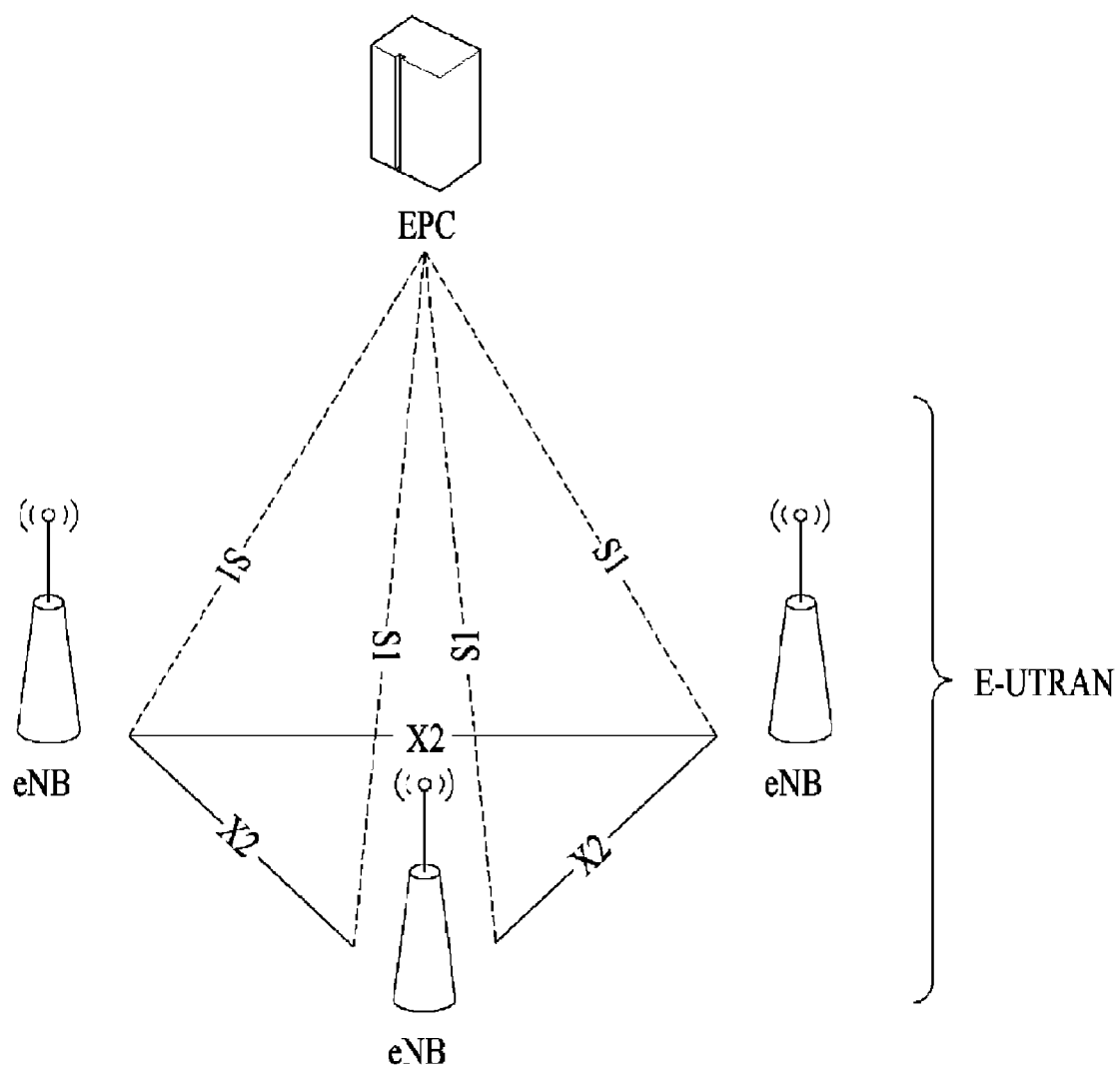
FIG. 2 is a conceptual diagram of E-UTRAN (evolved universal terrestrial radio access network) network structure.

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

Figure 3:
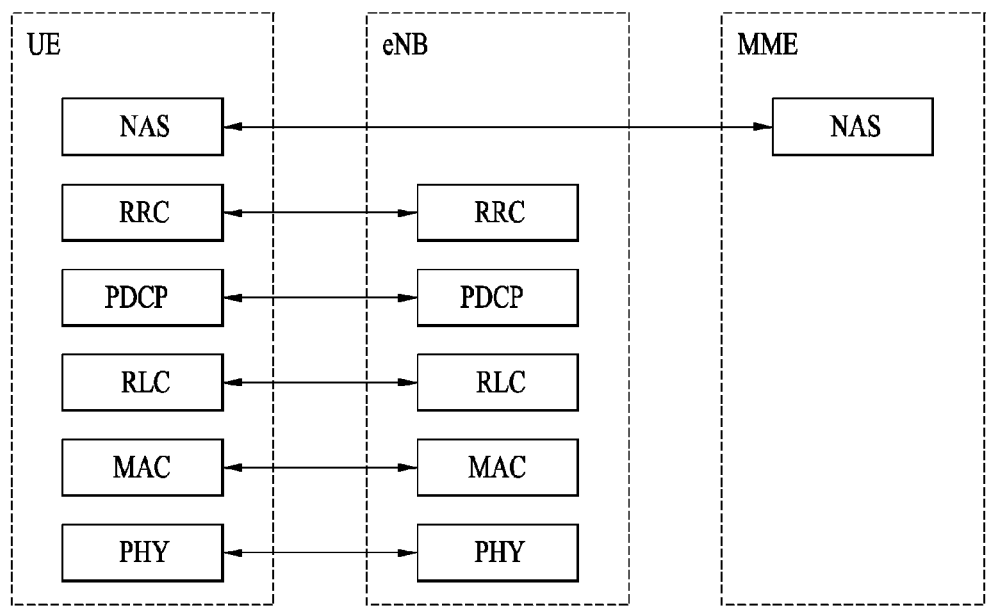
FIG. 3 is a diagram for structures of control and user planes of radio interface protocol between a 3GPP radio access network standard-based user equipment and E-UTRAN.
Figure 3:
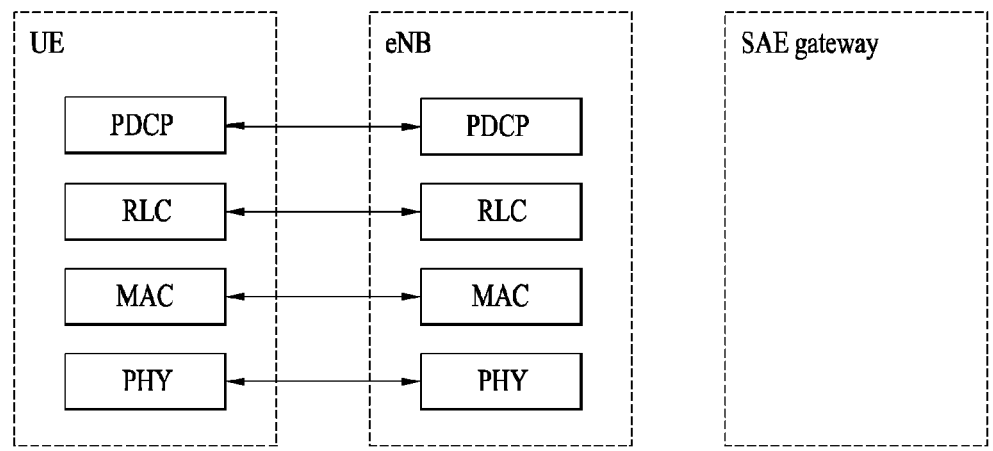

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 4:
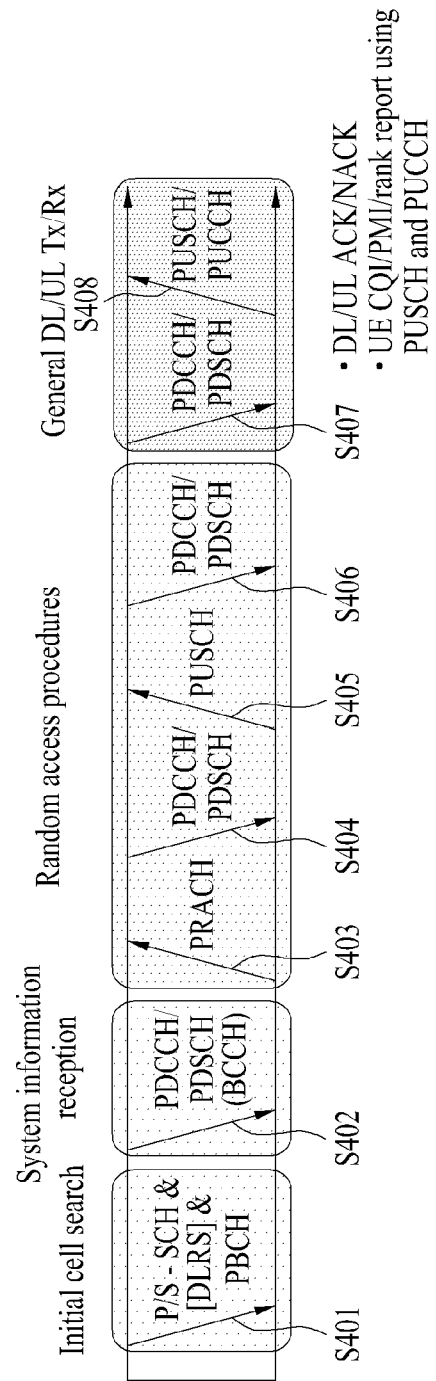
FIG. 4 is a diagram for explaining physical channels used for 3GPP system and a general signal transmission method using the physical channels.

FIG. 4 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S401]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S402].

Meanwhile, if a user equipment initially accesses an eNode B or does not have a radio resource for transmitting a signal, the user equipment may be able to perform a random access procedure to complete the access to the base station [S403 to S406]. To this end, the user equipment may transmit a specific sequence as a preamble on a physical random access channel (PRACH) [S403/S405] and may be then able to receive a response message on PDCCH and the corresponding PDSCH in response to the preamble [S404/S406]. In case of a contention based random access procedure (RACH), it may be able to additionally perform a contention resolution procedure.

Having performed the above mentioned procedures, the user equipment may be able to perform a PDCCH/PDSCH reception [S407] and a PUSCH/PUCCH (physical uplink shared channel/physical uplink control channel) transmission [S408] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 5:
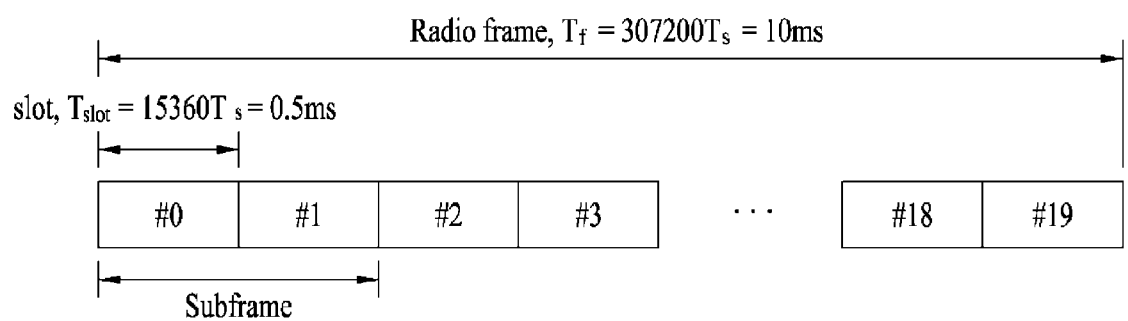
FIG. 5 is a diagram for a structure of a radio frame in LTE system.

FIG. 5 is a diagram for a structure of a radio frame used in an LTE system.

Referring to FIG. 5, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as a voice service, a data service from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

Figure 6:
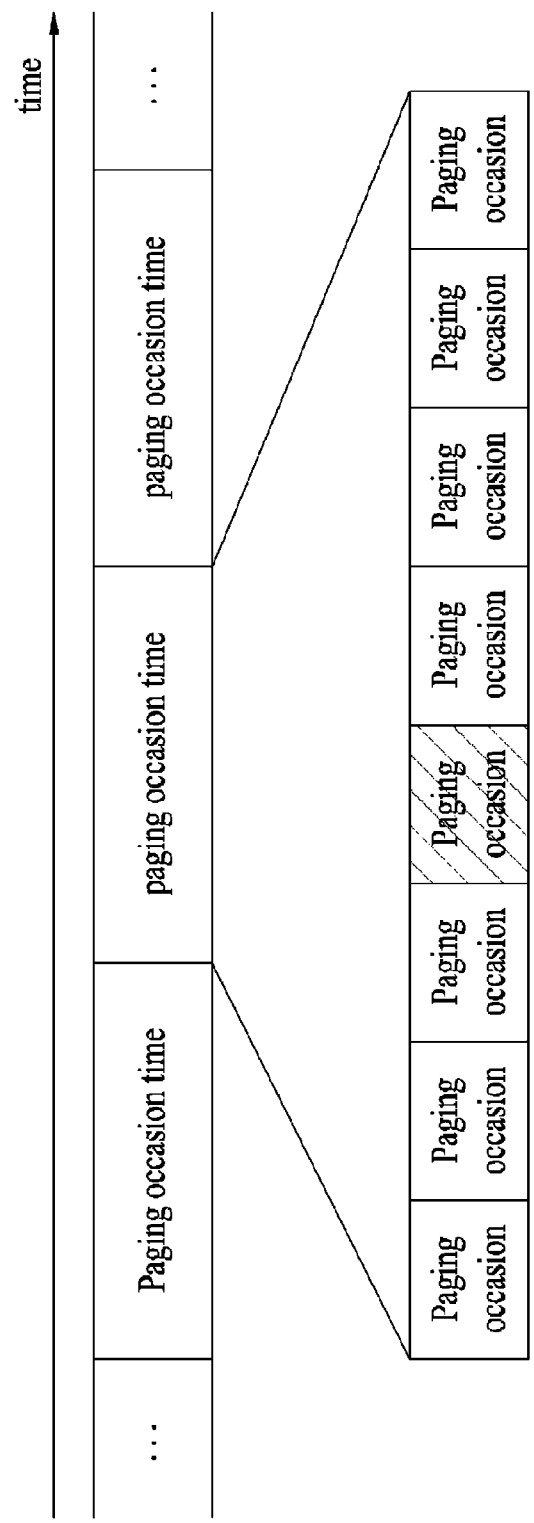
FIG. 6 is a diagram for explaining a general transceiving method using a paging message.

FIG. 6 is a diagram for explaining a general transceiving method using a paging message.

Referring to FIG. 6, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, a measurement and a measurement reporting are explained.

First of all, 'measurement' in the following description may be defined that a user equipment measures a quality value of a corresponding cell in a manner of receiving reference signals having received from cells situated on inter-frequency, intra-frequency, or inter-RAT according to a measurement configuration received from a network. And, 'quality' in the following description means a signal quality or cell quality identified by the reference signal having received from a measurement target cell.

In association with a mobility support of a user equipment in a mobile communication system, the user equipment measures the quality of a currently service-providing serving cell and that of a neighbor cell consistently or at least on every discontinuous reception (DRX) cycle. The user equipment reports a cell quality measurement result to a network on an appropriate timing and the network provides an optimized mobility to the user equipment via a handover and the like.

The user equipment performs a measurement of a specific purpose configured by the network to provide information for helping service providers manage the network besides the purpose of mobility support and may be able to report the cell quality measurement result to the network. For instance, the user equipment receives a broadcast information of a specific cell designated by the network. The user equipment is able to report a cell identifier (cell identity), i.e., a global cell identifier of the specific cell, a location identification information (e.g., tracking area code) that the specific cell belongs and/or other cell information (e.g., whether the specific cell is a member of CSG (closed subscriber group) cell) to the serving cell.

When a user equipment in a moving state checks that the quality of a specific area is very poor by performing a measurement, the user equipment is able to report the location information on the cells having poor quality and the cell quality measurement result to a network. The network is able to make an attempt on a network optimization based on the reports of the cell quality measurement result of the user equipments, which help to operate the network.

In a mobile communication system that a frequency reuse factor is '1', mobility is mostly obtained between cells different from each other situated in an identical frequency band. Hence, in order to well secure the mobility of a user equipment, the user equipment should be able to appropriately measure quality and cell information of neighbor cells having a same center frequency with that of a serving cell. As mentioned in the above, the measurement for the cell having a center frequency same with that of the serving cell is called an intra-frequency measurement. The user equipment makes the purpose of a corresponding cell quality measurement result accomplished in a manner of performing the intra-frequency measurement and then reporting the cell quality measurement result to a network on an appropriate timing.

A mobile communication service provider may be able to operate a network using a plurality of frequency bands. When the communication service is provided using a plurality of the frequency bands, in order to secure an optimized mobility for a user equipment, the user equipment should be able to appropriately measure the quality and cell information of neighbor cells having different center frequencies from that of a serving cell. As mentioned in the above, the measurement for the cell having a center frequency different from that of the serving cell is called an inter-frequency measurement. The user equipment should be able to report the cell quality measurement result to the network on an appropriate timing by performing the inter-frequency measurement.

In case that the user equipment supports a measurement for a heterogeneous network, the user equipment may be able to measure a cell of the heterogeneous network by an eNode B configuration. The measurement for the heterogeneous network is called an inter-RAT (radio access technology) measurement. For instance, RAT may include UTRAN (UMTS terrestrial radio access network) compliant with 3GPP standard, GERAN (GSM EDGE radio access network), and CDMA 2000 system compliant with 3GPP2 standard.

In the following description, a minimization of drive test (MDT) method is explained.

Minimization of drive test (MDT) is performed for a cell quality measurement by service providers for a cell coverage optimization using an automobile. Instead of using a method of related art performing a drive test, the MDT is able to make user equipments existing in a cell perform a measurement and then report its result, thereby minimizing time and cost for generating a cell coverage map and network optimization.

The MDT can be classified into a logged MDT and an immediate MDT. According to the logged MDT, after performing a measurement for the MDT, a user equipment saves the data in an MDT log and then delivers the data to a network on a specific timing. According to the immediate MDT, after performing a measurement for the MDT, the user equipment delivers the data to the network immediately. The difference of the two methods is whether the measured result performed by the user equipment is reported to the network immediately or is reported to the network later after it is stored. Specifically, since the user equipment in RRC idle state has no RRC connection, the user equipment cannot report a quality measurement result immediately. Thus, the logged MDT become available to the user equipment in RRC idle state.

Figure 7:
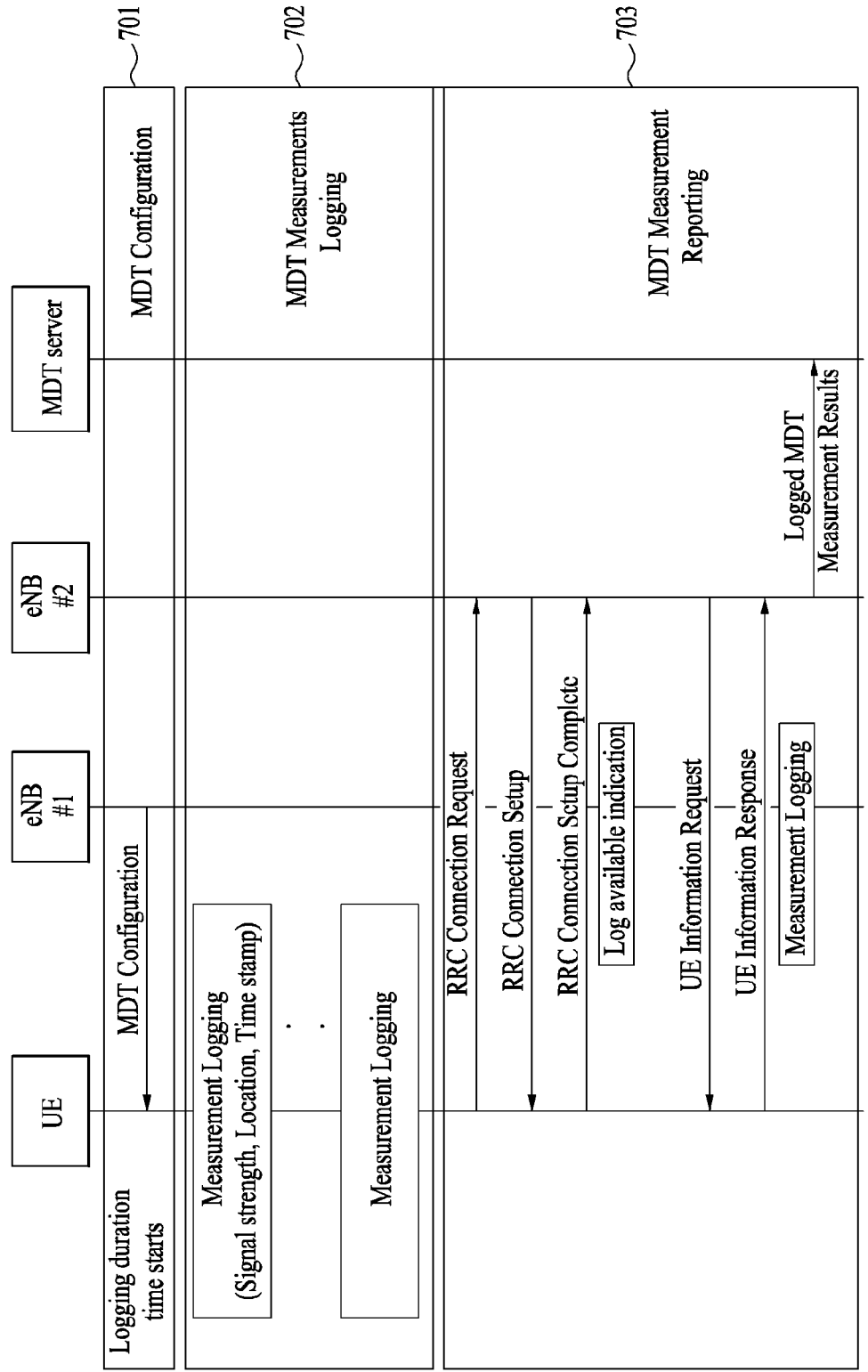
FIG. 7 is a signal flowchart for performing a logged MDT method.

FIG. 7 is a signal flowchart for performing a logged MDT method.

Referring to FIG. 7, first of all, the user equipment may be able to receive a message including a logged MDT configuration from a cell to perform the logged MDT shown in the step S701.

The logged MDT configuration received by the user equipment may include a triggering configuration, which becomes a beginning of an event logging, a valid duration of the MDT configuration, an area configuration for performing the MDT and the like.

In the step S702, as soon as the user equipment receives the logged MDT configuration, the user equipment starts a timer for the valid duration of the logged MDT configuration. The user equipment in RRC idle state stores a measurement result for the logged MDT in an MDT log according to a preset period only for the duration of which the valid duration timer operates. In this case, the preset period may indicate a period for saving the measurement results in accordance with the logged MDT configuration in the MDT log. In the following description, it is called a logging period and can be represented as a multiple of DRX cycle in general.

Meanwhile, when the valid duration timer is expired, the user equipment deletes the MDT configuration. However, the user equipment maintains the stored MDT cell quality measurement result for a prescribed time (e.g., 48 hours) and has an additional chance to report the MDT measurements value, which have been stored during the prescribed time, to a cell.

A value measured for the MDT is the quality of a cell in which the user equipment stays (camp on) in general and may be measured by the unit of RSRP (reference signal received power) or RSRQ (reference signal received quality). If the logged MDT is configured to the user equipment, the user equipment measures the quality of the cell in RRC idle state, stores it and then reports the MDT measurement value to the network later.

Service provider puts together the MDT measured values received from a plurality of user equipments and makes a coverage map indicating service availability and a distribution of the service quality throughout the whole area to which the service provider provides a service. And, the coverage map can be utilized for a network operation and optimization. For instance, if the service provider receives a report on a coverage problem of a specific area from the user equipment, the service provider is able to expand the cell coverage of a corresponding area in a manner of increasing a transmit power of an eNode B, which provides a service to the corresponding area.

Although a cell quality measurement result for the MDT can be called a log, a terminal log value, a measurement value, the cell quality measurement result or the like in a manner of being mixed, it shall be called an MDT measurement result in the following description for a clear and concise specification.

In the following description, a procedure for reporting an MDT measurement result shown in the step S703 is explained.

First of all, in case that the user equipment performs a logged MDT and a stored MDT measurement result exist in the user equipment, when the user equipment establishes an RRC connection, i.e., in the process of RRC connection establishment, the user equipment informs the network that the MDT measurement result have been stored in the user equipment via an RRC connection setup complete message.

Having received the message indicating the MDT measurement results have been stored in the user equipment, the network sends a command for transmitting the result of the stored MDT cell quality measurement to the network. The user equipment transmits the saved MDT measurement results to the network in response to the command.

In case that the user equipment re-establishes an RRC connection other than the case of establishing the RRC connection, the user equipment may be able to inform the network that the MDT measurement results have been stored in the user equipment via an RRC connection re-establishment complete message. And, in case that the user equipment performs a handover from a serving cell to a target cell, the user equipment may be able to inform the target cell that the MDT measurement results have been stored in the user equipment via a handover complete message.

Meanwhile, in case of the logged MDT method, a period for storing a measurement result in accordance with the aforementioned logged MDT configuration in an MDT log, i.e., a logging period and the period for performing an actual measurement by the user equipment, i.e., a measurement period may be different from each other. In particular, a quality measurement for a neighbor cell of the user equipment may be performed with a constant measurement period according to the internal operation of the user equipment or in case that a specific condition is satisfied.

Therefore, a case that a measurement for the neighbor cells has not been performed on the timing of storing the measurement result in the MDT log according to the configured logging period by the user equipment may occur. In this case, the user equipment determines that a latest value among the results having measured after a previously stored MDT log is valid and then stores its measurement result in the log.

Moreover, location information received from a GNSS (global navigation satellite system) can also be saved in the log together with the quality measurement result. This information may also be determined that the latest value among the location informations having measured after a previously stored MDT log is valid and then may be stored its measurement result in the log.

If the logging period is set to a very long value, although a measurement result value has been obtained in the latest, a difference between a timing point of obtaining the measurement result (or location information) and a timing point of storing the result in the log may be significant. In particular, there exists a problem that an error of the result values in the MDT log gets bigger as the logging period becomes longer. As the error becomes more significant, it becomes hard for a network to obtain a good quality of coverage map. Since the network performs a network optimization based on an inaccurate result, it may be possible to degrade the performance of the network.

Therefore, the present invention intends to propose a method for maintaining the constant reliability of informations in storing a measurement result in an MDT log by a user equipment, which performs a logged MDT method. In particular, when the measurement result is stored in the MDT log, the measurement result is stored in a manner of being limited to the measurement result obtained within a pre-defined window.

Figure 8:
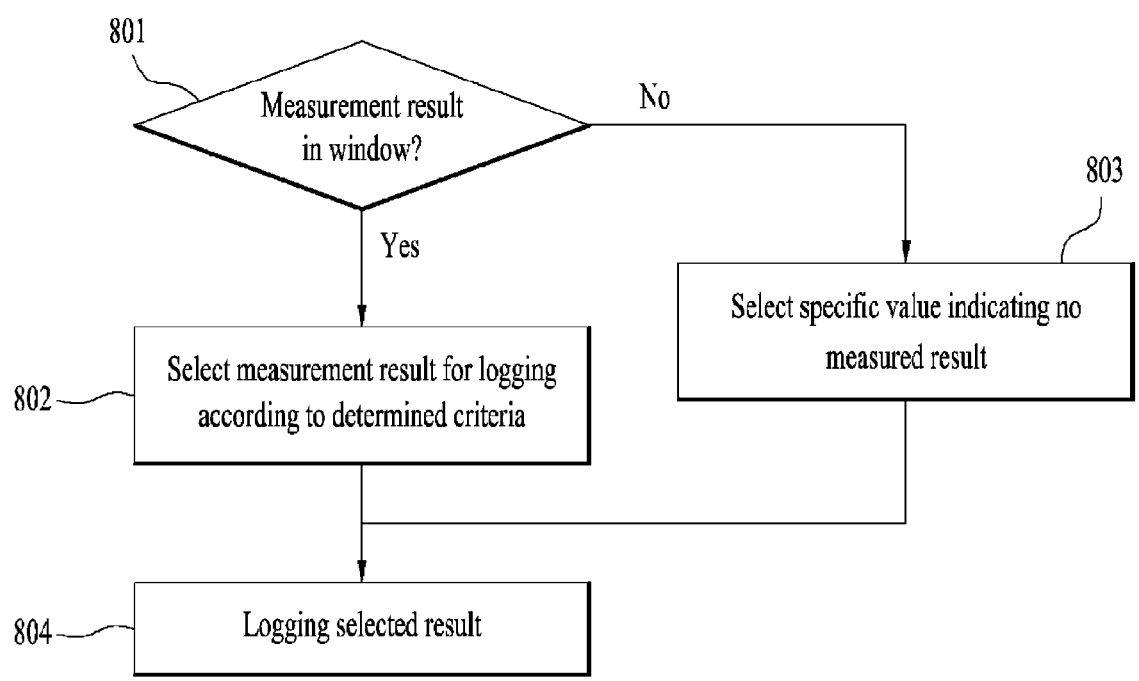
FIG. 8 is a flowchart for showing a method of a logged MDT method according to embodiments of the present invention.

FIG. 8 is a flowchart for showing a method of a logged MDT method according to embodiments of the present invention.

Referring to FIG. 8, first of all, a user equipment in RRC idle state determines whether it is a timing point of storing a measurement result in an MDT log. The timing point for storing in the MDT log can be defined by a specific period, i.e., a logging period.

The user equipment checks whether there exists a measurement result for MDT within a preset window in the step S801. The window corresponds to a size of a prescribed time and may be delivered from a network in a manner of being contained in a logged MDT configuration or a pre-defined value. The window can be represented as a multiple of DRX cycle such as the logging period. It is preferable to define a start timing point of the window as a timing point of storing in the MDT log, i.e., a subframe preceding as much as the size of the window in the subframe. In other word, an end timing point of the window corresponds to the timing point of storing the measurement result in the MDT log.

If a measurement result exists in the window, the user equipment selects the measurement result to be stored in the MDT log in the step S802. In particular, if there exist a plurality of measurement results in the window, the user equipment may be able to select the measurement result in a manner of calculating an average value of a plurality of the measurement results or selects a latest measurement result among a plurality of the measurement results.

If there does not exist a measurement result in the window, the user equipment selects a specific value indicating there is no measurement result in the window in the step S803. In this case, the specific value can be set to a lowest value among the measurement results. Through this, an eNode B is able to indirectly recognize that there is no good measurement result in the window. Or, the user equipment may be able to select a latest measurement result of an external of the window. In doing so, an indicator indicating that the selected measurement result is the measurement result of the external of the window can be included in the measurement result. In configuring a cell coverage map, the eNode B may be able to consider whether to use the measurement result via the indicator indicating the measurement result is the measurement result of the external of the window.

In the step S804, the user equipment stores the measurement result having selected in the step S802/S803 in the MDT log.

As mentioned in the foregoing description, when the user equipment stores a measurement result in the MDT log according to the MDT configuration, a time and location information can be stored together. In particular, in case that the location information is stored in the MDT log as well, the aforementioned embodiment can be applied.

In particular, if location information exists within the window, the user equipment selects the location information to be stored in the MDT log. If there exist a plurality of location informations in the window, the user equipment selects a latest location information among a plurality of the location informations or may be able to select the location information having a highest level of accuracy.

Likewise, if there does not exist location information in the window, the user equipment selects a specific value indicating there is no location information in the window or does not select any location information. Or, the user equipment may be able to select a latest location information of the external of the window. In doing so, an indicator indicating that the selected location information is the location information of the external of the window can be included in the location information.

Meanwhile, in case that there exist a plurality of measurement results in the window, the user equipment selects a measurement result having obtained on a nearest time from the time on which a location information has been received among a plurality of the measurement results for an agreement of a measuring timing both the measurement result and the location information.

Figure 9:
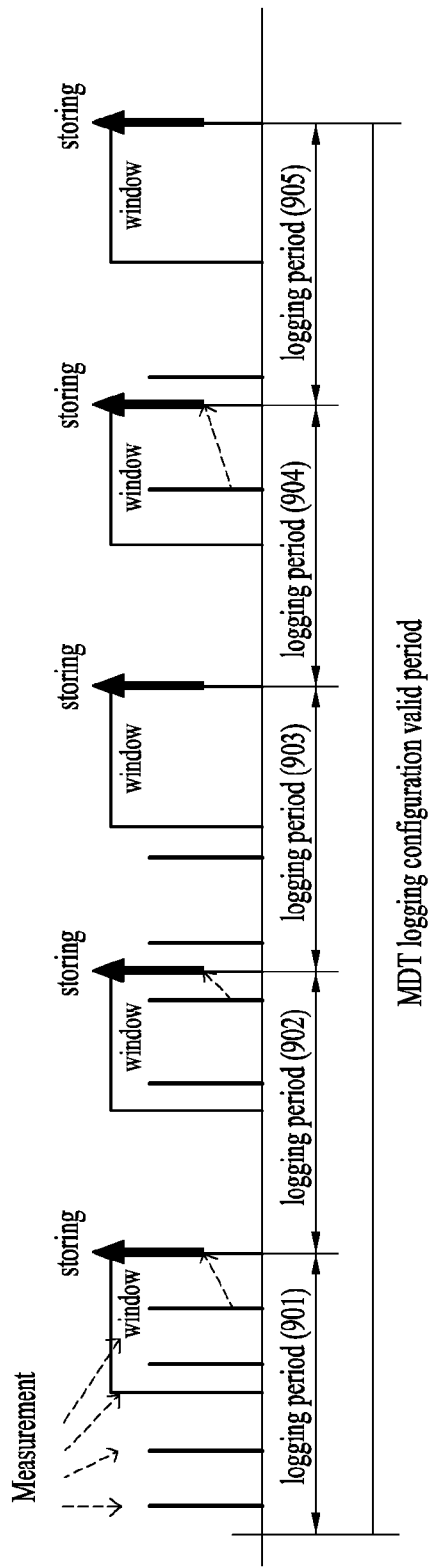
FIG. 9 is a conceptual diagram of a logged MDT method according to embodiments of the present invention.

FIG. 9 is a conceptual diagram of a logged MDT method according to embodiments of the present invention.

Referring to FIG. 9, the user equipment repeatedly stores a measurement result in the MDT log according to a logging period during the MDT configuration valid period. In this case, the user equipment may be able to store the measurement result in a manner of being limited to those having obtained in the preset window according to the embodiment of the present invention.

Specifically, there exist 2 measurement results in the windows of logging period 901 and 902, respectively. The user equipment stores an average value of a plurality of the measurement results or a latest measurement result in the MDT log.

And, since there does not exist a measurement result in the windows of the logging period 903 and 905, the user equipment stores a specific value indicating there is no measurement result in the windows in the MDT log. Or, the user equipment may be able to store a latest measurement result in the MDT log in a manner of selecting the latest measurement result of an external of the window. In this case, an indicator indicating that the selected measurement result is the measurement result of the external of the window can be stored in the MDT log together with the measurement result.

According to the present invention, the reliability of the measurement result stored in the MDT log is independent of a logging period and has an error as much as the size of a window from the timing point of being stored in the MDT log. Hence, the reliability of the result stored in the MDT log shall always be maintained irrespective of the logging period.

Figure 10:
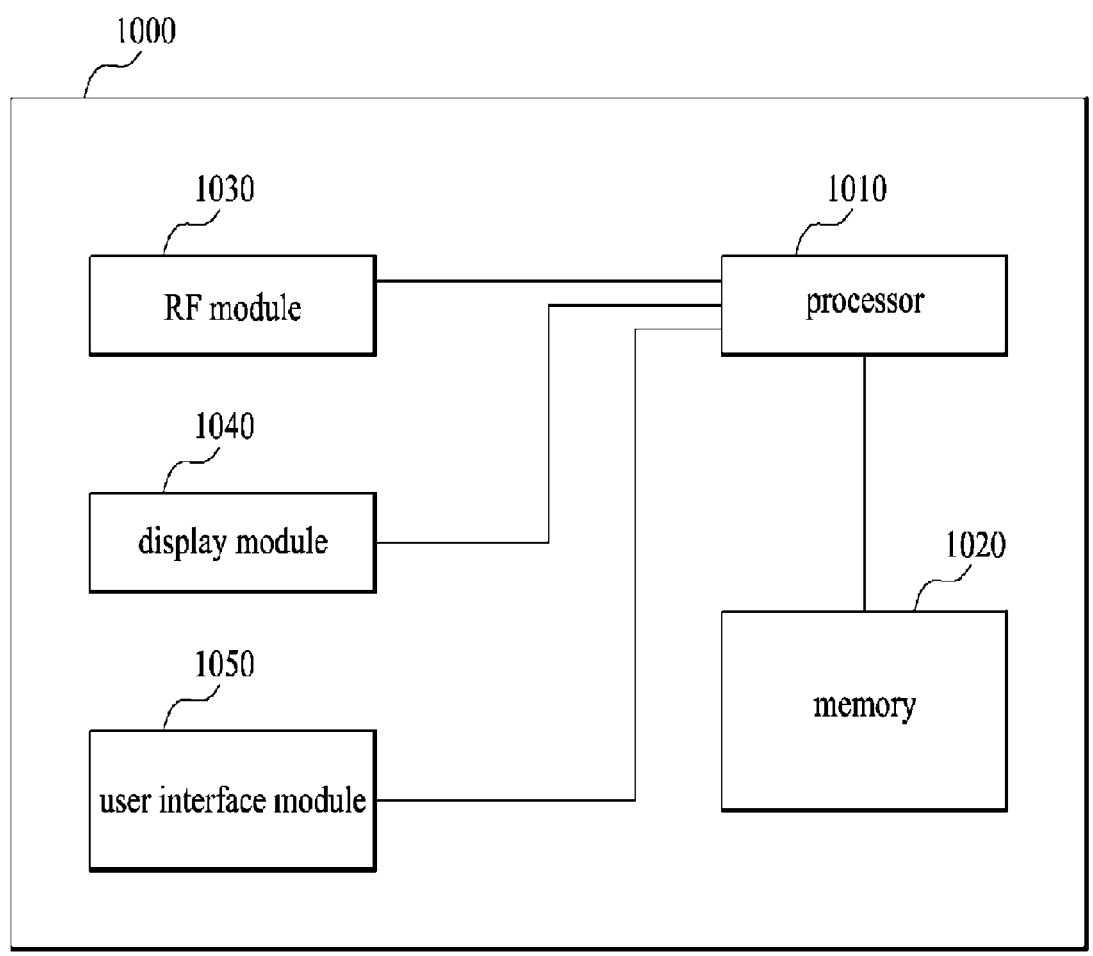
FIG. 10 is a block diagram for a configuration of a wireless communication transceiver according to one embodiment of the present invention.

FIG. 10 is a block diagram for a configuration of a communication transceiver according to one embodiment of the present invention. The transceiver may be a part of an eNode B or a user equipment.

Referring to FIG. 10, a transceiver 1000 may include a processor 1010, a memory 1020, an RF module 1030, a display module 1040, and a user interface module 1050.

Since the transceiver 1000 is depicted for clarity of description, prescribed module(s) may be omitted in part. The transceiver 1000 may further include necessary module (s). And, a prescribed module of the transceiver 1000 may be divided into subdivided modules. A processor 1010 is configured to perform an operation according to the embodiments of the present invention illustrated with reference to drawings.

Specifically, in case that the transceiver 1000 is a part of an eNode B, the processor 1010 generates a control signal and may be then able to perform a function of mapping the control signal to a control channel configured in a plurality of frequency blocks. And, in case that the transceiver 1000 is a part of a user equipment, the processor 1010 checks the control channel indicated to the processor from the signal received from a plurality of the frequency blocks and may be then able to generate a control signal from the control channel.

Thereafter, the processor 1010 may be able to perform a necessary operation based on the control signal. The detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of informations. And, the display unit 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting an MDT measurement result, which is reported by a user equipment to an eNode B in a wireless communication system and apparatus therefor are described with reference to examples applied to 3GPP LTE system, it may be applicable to various kinds of wireless communication systems as well as to the 3GPP LTE system.

What is claimed is:

1. A method for reporting a result of a Minimization of Drive Test (MDT) measurement to a base station at a user equipment in a wireless communication system, the method comprising:
   receiving, by the user equipment, MDT configuration information from the base station;
   performing, by the user equipment, a cell measurement for a serving cell periodically with a first interval;
   performing, by the user equipment, a cell measurement for a neighboring cell;
   logging, by the user equipment, a measurement result for the neighboring cell periodically with a second interval, based on the MDT configuration information,
   wherein information on the second interval is included in the MDT configuration information; and
   reporting, by the user equipment, the logged measurement for the neighboring cell result to the base station,
   wherein the logging comprises:
      when there is at least one measurement result for the neighboring cell within a window having a length of a third interval ending at the logging, logging, by the user equipment, the at least one measurement result for the neighboring cell, and
      when there is not any measurement result for the neighboring cell within the window, logging, by the user equipment, a latest measurement result for the neighboring cell external to the window and an indicator for indicating that there is not any measurement result for the neighboring cell within the window,
   wherein the third interval is smaller than the second interval, and
   wherein the third interval comprises a plurality of the first intervals.

2. The method of claim 1, wherein the logging further comprises:
   when there are a plurality of measurement results within the window, logging, by the user equipment, a latest measurement result among the plurality of measurement results.

3. The method of claim 1, wherein the logging further comprises:
   when there are a plurality of measurement results within the window, logging, by the user equipment, an average value of the plurality of measurement results.

4. The method of claim 1, wherein the MDT configuration information includes information on the second interval.

5. The method of claim 1, wherein the user equipment is in a Radio Resource Control (RRC) idle state.

6. The method of claim 1, wherein the second period and the third interval are defined as a unit of a Discontinuous Reception (DRX) cycle.

7. A user equipment for reporting a result of a Minimization of Drive Test (MDT) measurement to a base station in a wireless communication system, the user equipment comprising:
   a transmitter and a receiver for communicating with the base station; and
   a processor operatively connected to the transmitter and the receiver,
   wherein the processor is configured to:

receive MDT configuration information from the base station;
perform a cell measurement for a serving cell periodically with a first interval;
perform a cell measurement for a neighboring cell;
log a measurement result for the neighboring cell periodically with a second interval, based on the MDT configuration information,
wherein information on the second interval is included in the MDT configuration information; and
report the logged measurement result for the neighboring cell to the base station,
wherein, when there is at least one measurement result for the neighboring cell within a window having a length of a third interval ending at the logging, the processor logs at least one measurement result for the neighboring cell,
wherein, when there is not any measurement result for the neighboring cell within the window, the processor logs a latest measurement result for the neighboring cell external to the window and an indicator for indicating that there is not any measurement result for the neighboring cell within the window,
wherein the third interval is smaller than the second interval, and
wherein the third interval comprises a plurality of the first intervals.

8. The user equipment of claim 7, wherein when there are a plurality of measurement results within a window, the processor logs a latest measurement result among the plurality of measurement results.

9. The user equipment of claim 7, wherein when there are a plurality of measurement results within the window, the processor logs an average value of the plurality of measurement results.

10. The user equipment of claim 7, wherein the MDT configuration information includes information on the second interval.

11. The user equipment of claim 7, wherein the user equipment is in a Radio Resource Control (RRC) idle state.

12. The user equipment of claim 7, wherein the second period and the third interval are defined as a unit of a Discontinuous Reception (DRX) cycle.

* * * * *